United States Patent [19]

Kelly

[11] Patent Number: 4,659,343

[45] Date of Patent: Apr. 21, 1987

[54] PROCESS FOR SEPARATING CO₂ FROM OTHER GASES

[75] Inventor: Ralph M. Kelly, Houston, Tex.

[73] Assignee: The Cynara Company, Houston, Tex.

[21] Appl. No.: 774,251

[22] Filed: Sep. 9, 1985

[51] Int. Cl.⁴ .................................. B01D 53/22
[52] U.S. Cl. ................................. 55/16; 55/68; 210/640
[58] Field of Search .................. 55/16, 68, 73, 158; 210/640, 649–651

[56] References Cited

U.S. PATENT DOCUMENTS

| | | | |
|---|---|---|---|
| 2,159,434 | 5/1939 | Frey | 210/640 |
| 2,923,749 | 2/1960 | Lee et al. | 210/640 X |
| 2,947,687 | 8/1960 | Lee | 210/640 X |
| 2,958,656 | 11/1960 | Stuckey | 210/640 X |
| 3,043,891 | 7/1962 | Stuckey | 210/640 X |
| 3,415,038 | 12/1968 | Merten et al. | 55/16 |
| 3,534,528 | 10/1970 | Porter | 55/16 |
| 3,616,928 | 11/1971 | Rosenblatt | 55/158 X |
| 3,842,515 | 10/1974 | MacDonald et al. | 55/16 X |
| 4,080,743 | 3/1978 | Manos | 55/16 X |
| 4,080,744 | 3/1978 | Manos | 55/16 X |
| 4,127,625 | 11/1978 | Arisaka et al. | 55/16 X |
| 4,130,403 | 12/1978 | Cooley et al. | 55/16 |
| 4,181,675 | 1/1980 | Makin et al. | 55/16 X |
| 4,230,463 | 10/1980 | Henis et al. | 55/16 |
| 4,370,150 | 1/1983 | Fenstermaker | 55/16 |
| 4,374,657 | 2/1983 | Schondel et al. | 55/16 X |
| 4,386,944 | 6/1983 | Kimura | 55/16 |
| 4,421,529 | 12/1983 | Rovak et al. | 55/16 |
| 4,430,807 | 2/1984 | Davis et al. | 55/16 X |
| 4,466,946 | 8/1984 | Goddin, Jr. et al. | 55/16 X |
| 4,561,864 | 12/1985 | Klass et al. | 55/16 |

Primary Examiner—Robert Spitzer
Attorney, Agent, or Firm—Michael L. Glenn

[57] ABSTRACT

An improved process is described for separating carbon dioxide from light hydrocarbons by means of a membrane. The membrane separation is operated so that hydrocarbon liquids are condensed in contact with the membrane. This process is particularly valuable for the separation of gas mixtures into separate acid gas, gaseous hydrocarbon and liquid hydrocarbon streams.

16 Claims, 2 Drawing Figures

PROCESS FOR SEPARATING CO₂ FROM OTHER GASES

BACKGROUND OF THE INVENTION

This is an improved process for separating carbon dioxide from hydrocarbons in a fluid mixture using a semi-permeable membrane. In particular, this process involves condensation of hydrocarbon liquids from the fluid in contact with the membrane.

Numerous references exist which describe various processes for separating gases by means of semi-permeable membranes. U.S. Pat. No. 3,415,038 described a method for separating a first gas from a gaseous mixture using a thin, dry, asymmetric cellulose acetate membrane. U.S. Pat. Nos. 3,842,515, 4,080,744, 4,080,743 and 4,127,625 describe other techniques for drying a water-wet membrane to be used in gas separation. U.S. Pat. No. 4,130,403 teaches the separation of $CO_2$ from a natural gas stream by means of a dry cellulose ester membrane. U.S Pat. No. 4,374,657 discloses the separation of acid gases from gaseous hydrocarbon mixtures substantially free of methane by use of membranes. U.S. Pat. No. 3,616,928 describes vertical orientation of hollow fiber membrane devices to promote drainage of condensed liquid hydrocarbons during separation of hydrogen from gas mixtures.

The spiral membranes employed in the prior art for separation of carbon dioxide from light hydrocarbons are generally not suited to handling liquids. Many membrane compositions, such as those in U.S. Pat. No. 4,230,463, are deleteriously affected by liquid hydrocarbons. Heretofore, it has generally been thought that condensible hydrocarbons should be first separated from the carbon dioxide-containing gas mixture prior to bringing it in contact with the membrane.

SUMMARY OF THE INVENTION

The subject invention is an improved process for separating carbon dioxide from a fluid mixture with hydrocarbons comprising the steps of: (a) contacting a membrane selectively permeable to carbon dioxide with a fluid mixture comprising carbon dioxide and at least one $C_3$ to $C_8$ hydrocarbons, (b) permeating carbon dioxide through the membrane at conditions which result in the presence of liquid hydrocarbons in the fluid in contact with the membrane, and (c) separating the condensed liquid hydrocarbons from the gases which do not permeate through the membrane. Surprisingly, it has been found that the recovery and gas purity of the carbon dioxide stream from the membrane is not adversely affected by the presence of liquid hydrocarbons in the feed.

In another embodiment, this invention represents a process for separation of carbon dioxide from a mixture of at least one $C_1$ or $C_2$ hydrocarbon and at least one $C_3$ to $C_8$ hydrocarbon. In this process, the fluid mixture is contacted with a first membrane and carbon dioxide is selectively permeated through the membrane. The non-permeate is separated into a gaseous stream containing essentially all the carbon dioxide and methane present in the non-permeate and a liquid stream containing essentially all the $C_4$ and heavier hydrocarbons. The resulting gaseous stream is separated with a second membrane through which carbon dioxide is selectively permeated. The gaseous non-permeate consists predominantly of ethane or methane. In this alternative process, liquids are not necessarily present in contact with either the first or second membrane, but optionally can be present.

DETAILED DESCRIPTION OF THE INVENTION

Figure 1:
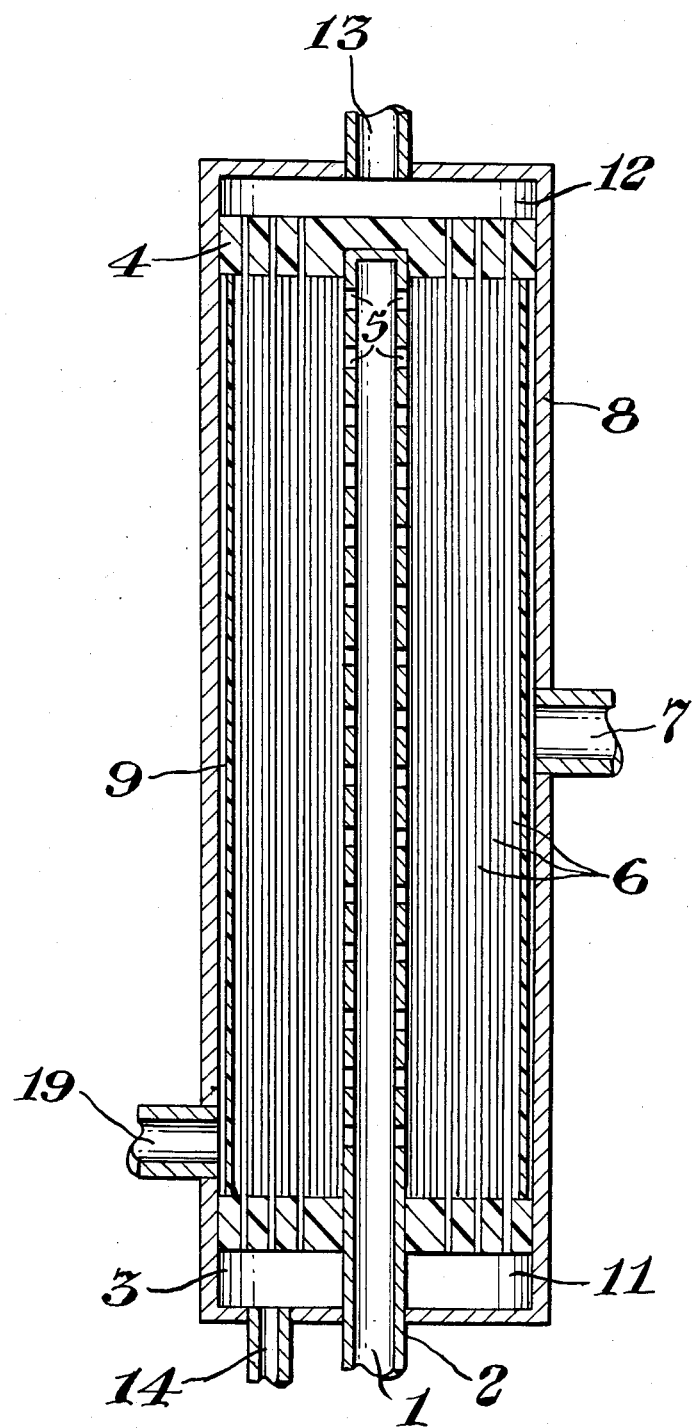
FIGS. 1 and 2 are schematic illustrations of embodiments of the process of this invention.

Membranes selectively permeable to carbon dioxide as used in this invention are known in the prior art. To be operable in the process wherein liquid hydrocarbons contact the membrane, a membrane should be selected which is not deleteriously affected by exposure to $C_1$-$C_8$ liquid hydrocarbons. Illustrative membranes are described in U.S. Pat. Nos. 3,415,038; 3,842,515; 4,080,743; 4,127,625; 4,130,403; and 4,421,529, as well as British Pat. No. 1,478,085, all of which are incorporated herein by reference. The skilled artisan can readily determine experimentally which of these membranes are adversely affected by exposure to liquid hydrocarbons.

Operable membranes include organic polymers and copolymers, optionally containing adjuvants such as fillers, plasticizers, stabilizers and permeability modifiers. Illustrative polymer compositions suitable for use in membranes can be selected from polysulfone, polyethersulfone, styrenic polymers and copolymers, polycarbonates, cellulosic polymers, polyamides, polyimides, polyethers, polyarylene oxides, polyurethanes, polyesters, polyacrylates, polysulfides, polyolefins, polyvinyls and polyvinyl esters. Interpolymers, including block repeating units corresponding to the foregoing polymers, as well as graft polymers and blends of the foregoing, are suitable for use in membranes. The aforementioned polymers can operably bear substituents, such as, fluoro, chloro, bromo, hydroxyl, alkyl, alkoxy, acyl or monocyclic aryl groups, so long as the substituents do not deleteriously affect the membrane properties.

Preferred as membranes are cellulose esters, e.g., cellulose acetate, cellulose diacetate, cellulose triacetate, cellulose propionate, cellulose butyrate, cellulose cyanoethylate, cellulose methacrylate and mixtures thereof. Mixed esters of cellulose, such as cellulose acetate butyrate, mixed cellulose acetates and cellulose acetate methacrylate, are also operable. Commercial cellulose triacetate, containing from about 42.7 to about 44 weight percent acetate, is the material of choice for the membranes used in the subject method.

Inasmuch as the flux of materials permeating is generally inversely related to the membrane thickness, it is desirable that the discriminating layer of the membrane be as thin as possible while maintaining adequate membrane strength and good rejection. Homogeneous membranes are operable, but asymmetric membranes are preferred. The preferred asymmetric cellulose ester membrane will typically have a dense discriminating layer less than one micron thick and a much thicker, relatively porous supporting sublayer.

Composite membranes, which have a porous supporting layer of dissimilar composition providing additional strength and integrity to the discriminating layer, are also preferred. For example, microporous polysulfone materials can be used as a supporting layer. Of course, this dissimilar support can include a second discriminating layer, but generally a second discriminating layer is neither necessary nor desirable.

The term "membrane" as used herein is intended to encompass a wide variety of possible configurations known in the prior art. For example, the membrane may be used as a flat film, tubular film or hollow fiber. The membrane can also be a spiral device, provided it is designed to accommodate liquids present in contact with the membrane.

A hollow fiber membrane is generally preferred and can be readily prepared by techniques known in the art. The internal and outside diameter of the fiber can operably be varied to modify membrane characteristics. The inside diameter is preferably about 30 to about 400 microns with a wall thickness of about 5 to about 150 microns. Especially preferred are cellulose triacetate fibers having an inside diameter of about 70 to about 130 microns and a wall thickness of about 75 to about 110 microns. Preferably, the wall thickness is at least 15 percent of the internal diameter.

Membranes suitable for use in the subject invention are commercially available. For example, water-wet cellulose ester membranes are available in both hollow fiber and spiral devices. To render these films suitable for the separation of non-aqueous fluids the film must be carefully dried so as to avoid significant disruption of the membrane structure. A preferred method for drying cellulose ester membranes is described in U.S. Pat. No. 4,430,807, which is incorporated herein by reference. One preferred technique for drying the water-wet membrane is to first anneal the fiber in 80° C. water for about 1.5 minutes. The water is then extracted from the fiber with isopropanol and the isopropanol displaced with hexane, heptane or isooctane in the manner taught in U.S. Pat. No. 3,842,515. A particularly preferred technique for drying water-wet hollow fiber membrane bundles is to introduce a 50:50 volume percent mixture of isopropanol and isooctane down the bore of each fiber while an inert gas stream is passed over the hollow fiber's outer surface. When the fiber is essentially free of water, the introduction of the isopropanol/isooctane mixture is terminated and the liquid remaining in the bore pervaporated through the membrane. Generally, such membranes will exhibit a $CO_2$ flux of at least about $1 \times 10^{-6}$ cm$^3$/(sec cm$^2$ cm of Hg) at 10° C. and 50 psig with a pure $CO_2$ feed.

As some shrinkage occurs in drying the hollow fiber, if the fiber is assembled in a bundle prior to drying, the construction of the bundle should allow tolerance for some shrinkage. For example, if a perforated core is employed, it should be designed so that some reduction in length will take place as the fibers shrink. Also, the epoxy resin tubesheet should be cured with an agent which promotes good adhesion with the hollow fibers, e.g., a commercial aliphatic amine curing agent.

The fluid in the feed stream contains carbon dioxide along with hydrocarbon liquids, gases or mixtures of hydrocarbon liquids and gases. Preferably, the predominant components present in addition to carbon dioxide are lower ($C_1$-$C_5$) saturated aliphatic hydrocarbons, such as methane, ethane, butane and propane, nitrogen and other components produced in association with crude oil. Preferably, such feed streams will contain from about 20 to about 90 volume percent $CO_2$ with a remaining amount of lower aliphatic hydrocarbons and optionally a small amount (preferably less than about 10 percent) of $H_2S$. For the instant separation process to work most efficiently, the feed gas preferably contains at least about 10 volume percent $CO_2$.

The feed stream is advantageously substantially free of water. Water can lead to undesirable hydrate formation and may necessitate drying of the carbon dioxide product later. With some membranes, minor amounts of water can be tolerated although the long-term performance of the membrane may suffer. Of course, the feed stream can be dried by use of desiccants or other techniques well known in the art.

Depending on the pressure and temperature of the feed stream, it can be present as either a gas or liquid. As the carbon dioxide selectively permeates through the membrane, the hydrocarbon dew point of the fluid not permeated gradually increases with increasing concentration of $C_3$ and higher hydrocarbons. Moreover, in certain preferred embodiments of the invention the expansion of the permeate reduces the temperature of the permeate, which efficiently cools the non-permeate through thermal cross exchange in hollow fiber membrane devices. Unlike prior art processes, liquid condensation of $C_3$ and higher hydrocarbon components in contact with the membrane is encouraged.

Advantageously, the condensed liquid present in the feed stream is not vaporized while in contact with the membrane. The fluid in contact with the membrane can exist as a two-phase mixture of gas and liquid. Optionally, the membrane device can be oriented vertically and adjacent membrane hollow fibers or membrane sheets spaced apart to promote movement of condensed liquid to a collection point in the housing of the membrane device where liquid can be separated and removed. Alternatively, the two-phase mixture can be conveyed from the membrane device to a conventional gas/liquid separator.

In the prior art membrane processes for separation of carbon dioxide from methane, the feed is pretreated by condensation at low temperatures to remove components which might otherwise condense in the membrane and the feed temperature is adjusted as necessary to prevent condensation. Alternatively, the feed gas is heated substantially above the hydrocarbon dew point in prior art techniques. It has now been found that these precautions are not necessary. Accordingly, improved separation factors are possible by operation at lower temperatures and the operating and capital cost of a system can be reduced due to elimination of pretreatment equipment to remove liquifiable components.

The pressure of the fluid feed stream can vary over a wide range dependent upon physical characteristics of the membrane. A pressure of from about 25 to about 1,000 pounds per square inch gauge (psig) is typically operable. Higher pressures are operable if the membrane is not deleteriously affected. All other operating parameters being equal, the carbon dioxide flux of the membrane generally increases with increased pressure in the feed stream.

The differential pressure across the membrane can also operably vary over a considerable range. Preferably, the pressure on the feed side of the membrane should be at least 40 psi greater than that on the permeate side of the membrane. A pressure differential of at least about 100 psi is more preferred.

The temperature at which the carbon dioxide separation is conducted should be such that liquids will be present in contact with or formed in contact with the membrane on the feed side in at least one stage. Temperatures in the range from about $-19°$ C. to about 40° C. are typically operable, dependent on a variety of factors. The optimum operating temperature depends upon the feed composition, the identity of the membrane and the pressure. The optimum temperature can be determined empirically.

Cooling of the feed stream and membrane from ambient temperatures to the temperature desired for separation can be accomplished by conventional refrigeration techniques or any other convenient means. In some embodiments of the invention, it is desirable to promote hydrocarbon condensation by cooling the feed before introduction to the membrane. The feed temperature is then adjusted as desired by heating. In one preferred embodiment, the feed stream is cooled in part by heat exchange with the permeate or non-permeate from the membranes.

The subject process can be conducted in a single membrane stage, but multiple membrane stages optimized for specific temperatures and feed compositions are generally preferred.

Several of the instant membrane separation units can be operated in parallel to increase the overall capacity of the separation device. Alternatively, several membranes can be employed in series to improve separation performance. The optimum number of membrane stages depends upon the feed composition, nature of the membrane, the process pressure, the permeate pressure, feed temperature and other factors. Not all the membrane stages need operate with liquids present in the fluid feed. The most advantageous number of stages can be determined empirically.

The liquids removed at different stages in a multiple stage membrane separation process will vary in composition and vapor pressure. Generally, these liquids are advantageously removed from the fluid in the membrane or in a separator and passed to a distillation column to enhance separation of hydrocarbon liquids from lighter fractions and compounds. It is desirable that the liquids separated via the membranes be introduced to the distillation column at the appropriate level to minimize heat required for efficient separation.

The carbon dioxide-enriched permeate has a variety of uses. The carbon dioxide can be injected into oil-bearing formations to enhance oil recovery in accordance with known methods. The carbon dioxide can also be used as an inerting gas. If $H_2S$ is present in the gas feed, it will generally permeate along with the $CO_2$. Advantageously, from 1 to 20 mole percent $H_2S$ can be present. It is desirable to selectively eliminate the $H_2S$ from the permeate by known gas conditioning methods, if the gas is to be used for inerting or $H_2S$ removal is otherwise desirable. The removal of carbon dioxide enhances the commercial value of the hydrocarbons present in the feed.

The liquid hydrocarbons separated in the subject process generally are predominantly $C_3$ and higher hydrocarbons. Essentially all $C_4$ and higher hydrocarbons (at least 90 percent) will be in the liquid phase, but a significant percentage of the $C_3$ hydrocarbons can be present in the gas. These hydrocarbons can be saturated or unsaturated and branched or straight chain. The methane and ethane fractions present in the feed are also selectively separated but are predominantly present in the hydrocarbon gas fraction. Essentially all methane will be present in the gas phase, but a significant percentage of ethane in the fluid feed may be present in the liquid phase. In preferred embodiments of the invention, the hydrocarbon gas product is suitable for sale to natural gas pipeline systems or for use in equipment and machinery fueled with natural gas.

In prior membrane separation systems, a part of the fluid which does not permeate is recycled to the feed to the membrane to further reduce the concentration of carbon dioxide and hydrogen sulfide. However, this recycle in the subject process increases the mole percent of light hydrocarbons in the fluid contacting the membrane thereby increasing the cooling required to separate the liquid hydrocarbons. It has now been found desirable to conduct further separation of carbon dioxide from the light hydrocarbon gas in one or more membranes connected in parallel with the membranes used to separate liquid hydrocarbons. The hydrocarbon gas from this parallel train of membranes can then be combined with the hydrocarbon gas from the membranes contacting the liquid hydrocarbons.

The concentration of $C_3$ and higher hydrocarbons in the feed to parallel membrane train is relatively low. Consequently, the pressure and temperatures of the hydrocarbon stream remains above the hydrocarbon dew point during contact with the second membrane train. The heat removed as a result of expansion of the permeated gas results in a significant temperature reduction, since no change of state occurs. The permeate gas also absorbs heat from the non-permeate, thereby reducing the temperature of both streams. The reduction in temperature of the non-permeate generally enhances the separation achieved in subsequent membrane stages. Alternatively, the cooled permeate and non-permeate streams can be used to cool feed to other membrane stages through heat exchange in conventional apparatus.

FIG. 1 depicts in cross-section, for purposes of illustration, a hollow fiber membrane device disposed vertically that could be used in the process of this invention. The fluid to be separated is introduced via inlet 1 to the fluid feed pipe 2. The fluid feed pipe 2 passes through a first tubesheet 3 and terminates in a second tubesheet 4. The section of the fluid feed pipe 2, between the first and second tubesheets 3 and 4, contains a plurality of perforations 5 through which the feed fluid will pass and thereafter contact a plurality of hollow fibers 6 oriented generally parallel with the longitudinal axis of the fluid feed pipe 2. Wrapped about the bundle of hollow fibers 6 is a porous polymer outer wrap 9, which helps to prevent shifting of hollow fibers 6. The feed fluid passes axially and radially through the bundle of hollow fibers 6 with most of the condensed hydrocarbon liquids present exiting through a first outlet 19 in the pressure case 8 surrounding the hollow fibers 6. The hydrocarbon gas which does not permeate through the hollow fibers 6 typically exits through a second outlet 7. The remainder of the feed fluid will permeate through the hollow fibers 6. The bores of the hollow fibers 6 communicate at each end through the tubesheets 3 and 4 with a first and second header space 11 and 12. The fluid which permeates through the hollow fibers 6 ultimately exits through a first and second outlet 13 and 14 in the pressure case 8.

The membrane device depicted in FIG. 1 can also be operated by passage of fluid feed to an inlet in the housing 7. The outlet 19 may be sealed in this embodiment. The non-permeate fluid exits through the core 2 after passing axially and radially through the bundle of hollow fibers 6. This non-permeate fluid can optionally contain both gas and liquid. Operation of the membrane device with outside in flow through the hollow fiber bundle generally is advantageous where a significant percentage of the fluid feed permeates through the hollow fiber membranes.

Figure 2:
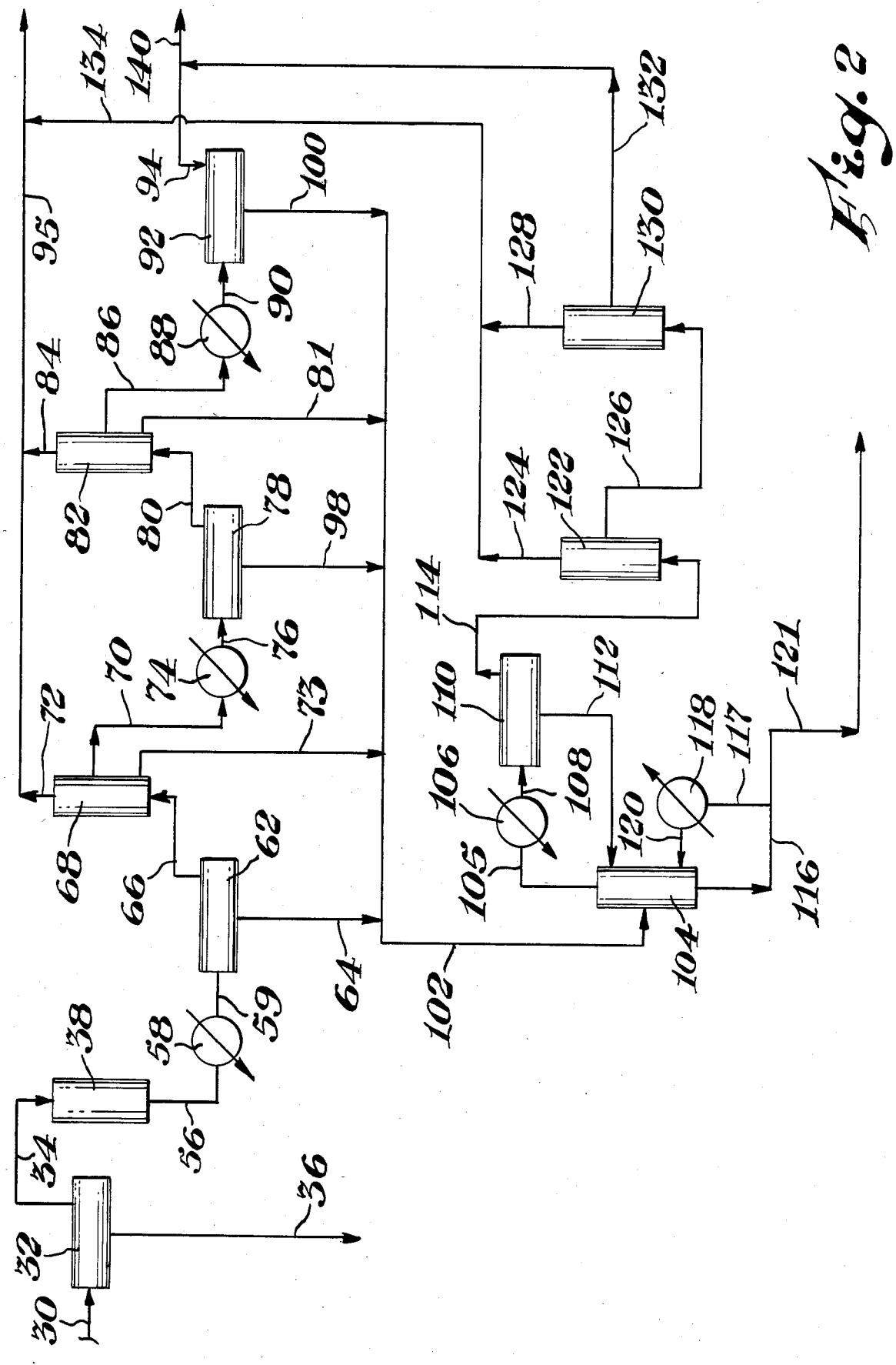

A simplified schematic diagram of a system for separating acid gases, i.e., carbon dioxide, natural or fuel gas, i.e., $C_1$ and $C_2$ hydrocarbons and liquid hydrocarbons from mixtures is presented in FIG. 2. The fluid feed mixture passes through a line 30 to a first gas/liquid separator 32. The separator 32 diverts the gas present to line 34 and most of the free liquid present to line 36. The fluid in line 34 is conveyed to a dehydrator 38 and the dry fluid exits through line 56.

The fluid in line 56 is cooled in a heat exchanger 58 and then passed through line 59 to a second separator 62. The liquid stream separated in separator 62 is conveyed through line 64. The predominantly gaseous fluid is passed from the separator 62 through line 66 to a first membrane 68. The permeate from the membrane 68 exits via line 72. The liquid non-permeate condensed in the membrane 68 exits through line 73. The gaseous non-permeate exits the membrane 68 through line 70 and is conveyed to a heat exchanger 74 where it is cooled.

The cooled non-permeate exits the heat exchanger 74 and is conveyed via line 76 to a third separator 78. The gaseous fraction removed by the separator 78 is passed through line 80 to a second membrane 82. The liquid fraction from the separator 78 passes through line 98.

The second membrane 82 separates an acid gas permeate which exits through line 84, a gaseous non-permeate stream conveyed through line 86 and a liquid permeate passed through line 81. The non-permeate from line 86 is conveyed first to a heat exchanger 88 and the cooled fluid is passed via line 90 to a separator 92. The separator 92 conveys a gas consisting mostly of ethane and methane through line 94.

The liquids from the second, third and fourth separators 62, 78 and 92 and from the first and second membranes 68 and 82 are conveyed from lines 64, 98, 100, 73 and 81 to line 102 and then to a distillation column 104. The higher boiling fraction exits the column 104 through line 116 and a portion is conveyed in line 117 to be heated in a reboiler 118 and recycled through line 120 to the column 104. The remainder of heavies in line 116 are passed to line 121.

The distillate from the column 104 is conveyed through line 105 to a heat exchanger 106. The cooled fluid exits the heat exchanger 106 through line 108 and passes to a separator 110. The liquids from the separator 110 are returned to the column 104 via line 112.

The gas fractions essentially free of $C_3$ and higher hydrocarbons from separator 110 are conveyed via line 114 to a third membrane 122. The permeate from the membrane 122 exits through 124. The non-permeate from membrane 122 is conveyed through line 126 to a second-stage membrane 130. The permeate from the membrane 130 is conveyed through line 128 to line 134, where it is combined with permeate from line 124. The non-permeate from the membrane 130 is conveyed via line 132 to line 140.

The permeate from the membranes passed through lines 72, 84 and 134 is combined in line 95. This permeate contains high concentrations of carbon dioxide and optionally hydrogen sulfide relative to that in the fluid feed in line 30.

The gas rich in methane and/or ethane conveyed in lines 94 and 132 is combined in line 140. The fuel gas emerging from line 140 can be further treated by wet gas conditioning techniques to remove residual hydrogen sulfide and carbon dioxide, if desired.

The liquid hydrocarbons are conveyed in line 121. These liquid hydrocarbons have value as feedstocks for refined petroleum products.

The schematic diagram presented in FIG. 2 can be readily adapted for handling fluid feeds of various compositions. Selection of suitable columns, separators, heat exchangers, dehydrators, membranes and compressors is within the ordinary skill in the art. In a preferred embodiment of the invention, the individual or combined permeate fluids, non-permeate gas and/or condensed liquid streams can cross-exchange heat with fluids in lines 56, 70 and/or 86 to lessen or eliminate refrigeration equipment associated with heat exchangers 58, 74 or 88. In another preferred embodiment of the invention, the fluids from lines 64, 73, 81, 98 and 100 are introduced separately to different levels of the separation column 104 dependent upon their composition to enhance efficiency in separation. Additional membrane stages, compressors and other auxiliary equipment can be added as necessary.

Projected recoveries of components in gaseous hydrocarbon streams and liquid hydrocarbon streams, separated by a typical system similar to that in FIG. 2, is presented in Table I for fluid feeds of various compositions. The gas hydrocarbon stream corresponds to that in line 140 in FIG. 2 and the liquid composition is that in line 121. The feed gas pressure is in the range of 350 to 500 pounds per square inch gauge (psig). The feed gas composition in mole percent exclusive of carbon dioxide is 0.56 percent $H_2S$, 2.50 percent $N_2$, 50.52 percent $CH_4$, 16.92 percent $C_2H_6$, 15.37 percent $C_3H_8$, 2.14 percent $i\text{-}C_4H_{10}$, 5.12 percent $n\text{-}C_4H_{10}$ and 6.87 percent $C_5$ and higher alkanes.

TABLE I

| % $CO_2$ in feed | Hydrocarbon Stream | % of Component Recovered in Process Hydrocarbon Streams** | | | | | | | | |
|---|---|---|---|---|---|---|---|---|---|---|
| | | $CO_2$ | $H_2S$ | $N_2$ | $C_1$ | $C_2$ | $C_3$ | i-$C_4$* | n-$C_4$* | $C_5$+ |
| 20 | Gas | 22.8 | 22.3 | 98.4 | 97.9 | 97.9 | 10.4 | 1.8 | 0.8 | 0.02 |
| 20 | Liquid | 0.0 | 0.5 | 0.0 | 0.0 | 0.1 | 89.5 | 98.2 | 99.2 | 100 |
| 30 | Gas | 14.7 | 16.2 | 97.6 | 96.8 | 97.3 | 12.6 | 1.8 | 0.6 | 0.6 |
| 30 | Liquid | 0.0 | 0.0 | 0.0 | 0.0 | 0.6 | 89.3 | 97.8 | 99.2 | 98.8 |
| 40 | Gas | 9.0 | 10.7 | 96.7 | 95.8 | 96.6 | 12.7 | 1.7 | 0.5 | 0.8 |
| 40 | Liquid | 0.0 | 0.0 | 0.0 | 0.0 | 0.6 | 89.4 | 98.0 | 99.2 | 98.5 |
| 50 | Gas | 5.2 | 6.1 | 96.0 | 94.8 | 95.9 | 11.6 | 1.5 | 0.4 | 0.7 |
| 50 | Liquid | 0.0 | 0.0 | 0.0 | 0.0 | 0.4 | 89.4 | 98.3 | 99.2 | 98.8 |
| 60 | Gas | 2.9 | 2.9 | 91.7 | 89.8 | 90.9 | 9.9 | 1.2 | 0.4 | 0.4 |
| 60 | Liquid | 0.0 | 0.3 | 0.0 | 0.0 | 0.2 | 88.8 | 98.5 | 99.3 | 99.1 |
| 70 | Gas | 1.6 | 1.1 | 83.3 | 79.9 | 80.7 | 8.4 | 1.0 | 0.3 | 0.1 |
| 70 | Liquid | 0.0 | 0.6 | 0.0 | 0.0 | 0.2 | 87.3 | 98.2 | 97.3 | 99.2 |
| 80 | Gas | 0.9 | 1.3 | 75.0 | 70.4 | 71.1 | 7.8 | 0.9 | 0.3 | 0.0 |
| 80 | Liquid | 0.0 | 0.9 | 0.0 | 0.0 | 0.7 | 84.4 | 97.2 | 95.5 | 98.6 |
| 90 | Gas | 0.3 | 3.6 | 68.4 | 63.0 | 64.2 | 8.8 | 0.8 | 0.2 | 0.03 |

TABLE I-continued

| % $CO_2$ in feed | Hydrocarbon Stream | % of Component Recovered in Process Hydrocarbon Streams** | | | | | | | | |
|---|---|---|---|---|---|---|---|---|---|---|
| | | $CO_2$ | $H_2S$ | $N_2$ | $C_1$ | $C_2$ | $C_3$ | i-$C_4$* | n-$C_4$* | $C_5+$ |
| 90 | Liquid | 0.0 | 0.9 | 0.0 | 0.0 | 1.9 | 79.7 | 95.0 | 94.4 | 96.9 |

*i-$C_4$ is isobutane and n-$C_4$ is n-butane.
**Recovery is expressed as percent of component present in inlet stream.

Cryogenic separation processes are used in the prior art to separate $C_3$ and higher hydrocarbons from methane, ethane and ethylene. The process of this invention offers lower capital cost, lower energy cost, equivalent liquid hydrocarbon recovery, recovery of hydrocarbon gas recovery in a compact processing unit.

What is claimed is:

1. An improved process for separating carbon dioxide from a fluid mixture with hydrocarbons comprising the steps of:
   (a) contacting a liquid-hydrocarbon tolerant membrane selectively permeable to carbon dioxide with a fluid mixture comprising carbon dioxide and at least one $C_3$ to $C_8$ hydrocarbon;
   (b) permeating carbon dioxide from the fluid mixture through the membrane at conditions which result in the presence of at least one condensed liquid hydrocarbon in the fluid mixture in contact with the membrane; and
   (c) separating the condensed liquid hydrocarbon from the gases which do not permeate the membrane.

2. The process as described in claim 1 wherein the hydrocarbon fluid mixture in Step (a) comprises $C_1$ through $C_5$ hydrocarbons.

3. The process as described in claim 2 wherein the hydrocarbon fluid comprises 1 to 20 percent hydrogen sulfide.

4. The process as described in claim 2 wherein the membrane is a water-dry cellulose ester membrane.

5. The process as described in claim 2 wherein the membrane is a hollow fiber membrane.

6. The process as described in claim 5 wherein the membrane is a water-dry cellulose acetate membrane.

7. The process as described in claim 5 wherein the membrane includes a pressure case and said pressure case has separate outlets for removal of non-permeate liquids and non-permeate gases.

8. The process as described in claim 2 wherein a plurality of membranes are employed in series.

9. The process as described in claim 2 further comprising: (d) contacting the non-permeate gases from Step (c) with a membrane selectively permeable to carbon dioxide, (e) permeating carbon dioxide through the membrane to produce permeate and non-permeate gas streams, and (f) recovering gaseous hydrocarbons from the non-permeate.

10. The process as described in claim 9 wherein the permeate or non-permeate gas from Step (e) is employed to cool feed gas introduced to the membrane in Step (a).

11. The process as described in claim 2 further comprising separating the non-permeate from Step (c) in a distillation column to remove in the distillate essentially all methane and carbon dioxide present and essentially all the $C_4$ and heavier hydrocarbons in the bottoms.

12. The process as described in claim 11 further comprising: (d) contacting the overheads from the distillation column with a membrane selectively permeable to carbon dioxide, (e) permeating carbon dioxide through the membrane to produce permeate and non-permeate gas streams and (f) recovering a gaseous non-permeate consisting predominantly of methane and ethane.

13. The process as described in claim 12 wherein the non-permeate or permeate gas from Step (e) is employed to cool feed gas introduced to the membrane in Step (a).

14. The process as described in claim 11 wherein the non-permeate or permeate gas from Step (e) is used to cool fluids in process steps.

15. The process as described in claim 2 wherein the membrane exhibits a $CO_2$ flux with pure $CO_2$ of at least about $1 \times 10^{-6}$ cm$^3$/(sec cm$^2$ cm of Hg) at 10° C. and 50 psig.

16. The process as described in claim 15 wherein the membrane is a water-dry cellulose triacetate membrane.

* * * * *